Oct. 21, 1969

K. G. KING 3,474,322

CONTROLLABLE RECTIFIER CIRCUITS PROVIDING ENERGY
RECOVERY FROM COMMUTATION CIRCUIT

Filed Dec. 22, 1967

3 Sheets-Sheet 1

United States Patent Office 3,474,322
Patented Oct. 21, 1969

3,474,322
CONTROLLABLE RECTIFIER CIRCUITS PROVIDING ENERGY RECOVERY FROM COMMUTATION CIRCUIT
Kenneth G. King, London, England, assignor to Westinghouse Brake and Signal Company, Limited, London, England
Filed Dec. 22, 1967, Ser. No. 692,752
Claims priority, application Great Britain, Jan. 24, 1967, 3,529/67
Int. Cl. H02m 7/44, 7/68
U.S. Cl. 321—45                                     25 Claims

ABSTRACT OF THE DISCLOSURE

An arrangement for recovering surplus energy from the commutating circuit of a forced commutation thyristor inverter in order to increase the efficiency of the inverter. Excess energy released at each commutation is accumulated in an auxiliary capacitor or capacitors and subsequently restored to the inverter in series with the D.C. supply through auxiliary thyristors.

---

This invention relates to circuits employing artificial communication of a controllable rectifier device and relates in particular to circuits employing associated current limiting inductance and a commutating capacitor.

The invention is more especially applicable to inverters employing such circuits in which feedback networks are present which permit the flow of reactive energy following commutation by such a commutating capacitor.

According to the present invention there is provided a controllable rectifier circuit including a controllable rectifier means and a current limiting inductance connected in series via which current is supplied from a source to a load, a commutating capacitor being provided connectable to divert current flow from said means to render the means non-conducting to achieve turn-off thereof and a further capacitor into which at least partial diversion of inductive current in said inductance is provided following said turn-off.

Preferably means is provided for at least partially discharging said further capacitor into the supply side of the circuit following said diversion.

In an inverter employing the invention and having two such inductances one in each supply line from a D.C. source, the inductances may each be provided with such a further capacitor or alternatively, in the event of these inductances being mutually coupled, a single such capacitor may be provided into which reactive energy due to both inductances is at least partially diverted as aforesaid.

In order that the invention may be clearly understood and readily carried into effect, the same will be further described by way of example with reference to the accompanying drawings in which.

Figure 1:
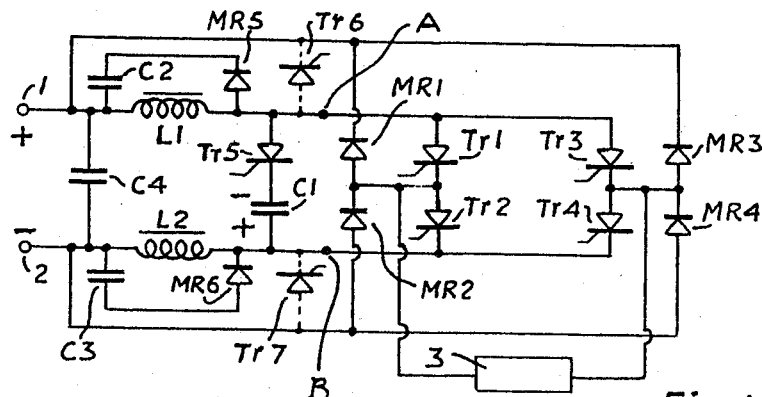
FIG. 1 and FIG. 2 illustrate inverter circuits employing the invention.

Referring to FIG. 1, this illustrates a bridge type of inverter having input terminals 1 and 2 connected to a direct current supply source with the polarity shown. The terminal 1 is connected via a current limiting inductance L1 to one of the D.C. terminals of a bridge configuration of semiconductor controllable rectifier devices TR1, TR2, TR3 and TR4 as shown. The other D.C. terminal of the bridge configuration is connected to the terminal 2 via a further current limiting inductance L2. In addition, across the supply to the bridge configuration there is connected a commutating capacitor C1 in series with a further semiconductor controllable rectifier device TR5 as shown. Although not shown, there is associated with the capacitor C1, a charging circuit whereby the capacitor C1 is rechargeable following each consecutive commutation. The charging circuit may be a circuit such as described in the Specification of British Patent No. 920,106.

The load 3 which the circuit supplies is assumed to be inductive and is connected across the alternating current terminals of the bridge configuration of devices TRI to TR4, namely, the junctions of TR1 and TR2 and TR3 and TR4 as shown. Further, in order to return inductive currents following commutation of the current through the semiconductor controllable rectifier devices, to the supply, feedback diodes MR1, MR2, MR3 and MR4 are connected as shown and additionally, across the inductances L1 and L2 there are connected respective series combinations of diode MR5 and capacitor C2 and diode MR6 and capacitor C3. In addition, optional semiconductor controllable devices TR6 and TR7 are provided in paths in parallel with the inductances L1 and L2 respectively, as shown by the dotted connections. These optional devices have a purpose which will be appreciated following further discussion of the operation of the circuit. A suitable input capacitance C4 is additionally connected across the supply terminals to provide a steady low impedance supply source.

In operation of the circuit arrangement of FIG. 1, it will be assumed that there is provided a suitable driving circuit for applying triggering signals to the semiconductor controllable rectifier devices TR1, TR2, TR3 and TR4 so that the pairs TR1 and TR4, TR2 and TR3, are triggered together. In addition, the driver is required to provide triggering signals to the device TR5 between the triggering instants of the successive pairs of devices in the bridge configuration. Assuming that the devices TR1 and TR4 are conducting, current flows from the supply terminal 1 via the device TR1 to one terminal of the load 3 and from the other terminal of the load 3 via the device TR4 back to the other supply terminal via the inductance L2. If, on the other hand, the devices TR2 and TR3 were to be conducting, the current limiting inductances would be conducting in the same direction as previously but the current in the load 3 would be in the opposite direction. It is, therefore, appreciated that the circuit basically operates as an inverter to apply alternating current to the load 3. For the purpose of successive commutation of the pairs of devices TR1, TR4 and TR2, TR3, the capacitor C1 is charged with the polarity shown to a voltage higher than the supply voltage. When the commutating device TR5 is triggered, reverse voltages are applied to the devices TR1 and TR4 and they are rendered non-conducting. If the load 3 is inductive, the reactive energy stored in the load is returned to the supply via diodes MR2 and MR3. During the period following the triggering of the device TR5, current flows from the supply into the capacitor C1 through inductances L1 and L2 starting at a value equal to the load current just before commutation occurs and increasing up to the instant at which the voltage on C1 becomes equal to the supply voltage. It is then necessary to limit the further rise of voltage on the capacitor C1, which may otherwise increase until the semiconductor controllable rectifier device of the bridge configuration are rendered conducting without triggering signals owing to excessive anode voltage being applied thereto. This may be assumed to be achieved by the subsequent triggering of the devices TR2 and TR3 but it will be appreciated that a circulating current is thus established which tends to keep the increased current flowing in the inductances L1 and L2. Increases in this inductive circulating current tend to occur in the absence of measures being provided to prevent them being cumulative as commutation periodically proceeds in operation of the circuit and the current may well build up a level at which commutation of the circuit fails. However, by providing the parallel paths consisting of MR5 and C2 and MR6 and C3, this shortcoming may be overcome as is graphically illustrated in FIG. 3 which shows curves of voltage at points A and B in the circuit of FIG. 1, together with a corresponding curve of inductance current in L1 or L2.

Figure 3:
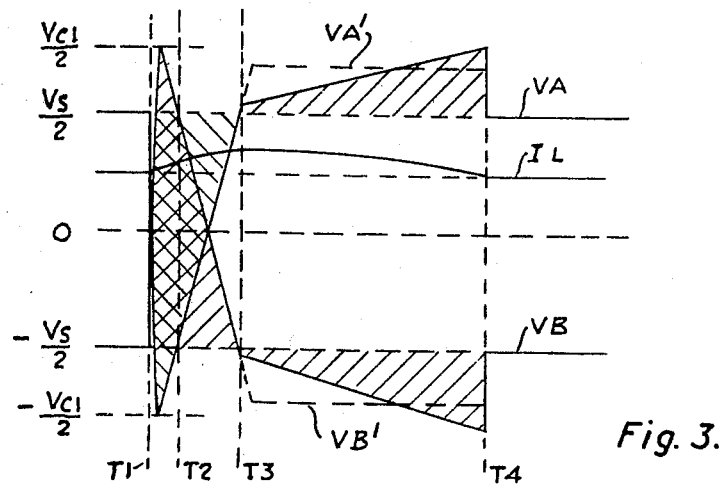
FIG. 3 illustrates waveforms to be referred to with reference to the manner of operation of FIG. 1.

Referring to FIG. 3 along with the circuit arrangement of FIG. 1, assuming that the triggering of a subsequent pair of semiconductor controllable rectifier devices in the bridge configuration is delayed following commutation of the previous pair, so that no circulating path is initially established and assuming that commutation by triggering of the device TR5 takes place at the instant T1 in FIG. 3, the conducting devices TR1 and TR4 are reverse biased for just so long as the voltage on the commutating capacitor C1 exceeds the supply voltage. This condition pertains until the point, say, T2 in FIG. 3. The potential at the point A rises towards the potential of the positive supply terminal and the current in the inductances L1 and L2 rises up to the point T3 in FIG. 3, where the voltage across them falls to zero. The devices TR1 and TR4 are now non-conducting and the devices TR2 and TR3 have as yet not been triggered so that there is as yet no circulating current path across the inductance L1 or the inductance L2. At the instant T3 or very shortly thereafter, the precise instant depending upon the voltage to which the further capacitors C2 and C3 are initially charged, the diodes MR5 and MR6 are forward biased and the capacitors C2 and C3 are effectively connected in parallel with the capacitor C1. These capacitors therefore, share the current which flows in the inductances L1 and L2 with the capacitor C1. Since it is stipulated that the capacitance of the additional capacitors C2 and C3 are substantial in relation to capacitance C1, the potential at the point A continues to rise but at a substantially lower rate depending upon the precise realtive capacitive values, until the instant T4 at which the total voltage-time integral over the inductances L1 and L2 measured from the commutation instant T1, becomes zero. This instant occurs when the shaded areas under the curve VA are equal and at this point the current in the inductances L1 and L2 is at its initial value. The devices TR2 and TR3 are then arranged to be triggered into their conducting condition and any current in L1 and L2 which is not immediately taken up by the load circuit, can circulate via the devices TR2 and MR2 or TR3 and MR3, as the case may be. It may be appreciated that this circulating current is no greater than the current existing in the devices L1 and L2 prior to commutation and there is, therefore, no tendency for build up of the current in L1 and L2 or therefore of charge on the capacitor C1 over successive commutations of the pairs of devices in the bridge configuration of the inverter.

Hitherto, no description of the purpose of the optional devices TR6 and TR7 has been given but it will now be appreciated that if the inverter is to be operated to provide a controllable output voltage by advancing and retarding the firing angle of the pairs of semiconductor controllable rectifier devices in the bridge configuration of the inverter, the devices TR6 and TR7 may be triggered at the instant T4 at which as stipulated above the devices TR2 and TR3 were assumed to have been triggered to provide a continuing recirculating path for the current in L1 and L2 and thus prevent further rise of voltage across capacitor C1 up to the point at which devices T2 and T3 are triggered.

Further, if in the inverter arrangement of FIG. 1, the inductances L1 and L2 are arranged to be mutually coupled, it is possible to dispense with one of the further capacitors C2 or C3 and its associated diode. In this case, the recirculating energy in both the inductances L1 and L2 is at least partially diverted into a single additional capacitance.

Figure 2:
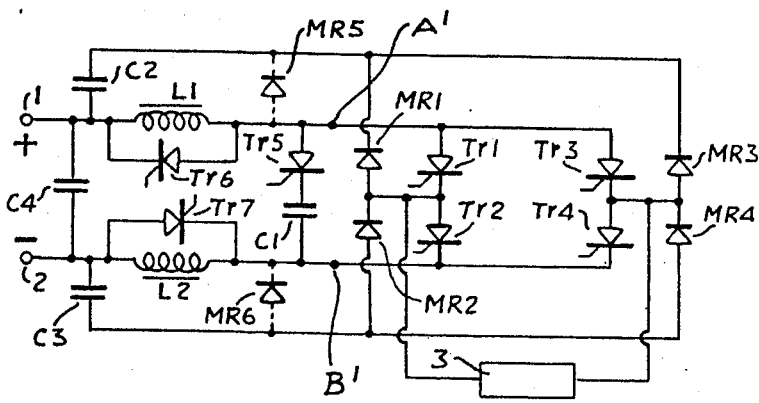

Referring now to the circuit arrangement of FIG. 2, this circuit is basically substantially the same as the circuit of FIG. 1 except that the further capacitors C2 and C3 into which current in the inductances L1 and L2 is diverted, are included in the feedback paths from the feedback diodes MR1, MR3 and MR2 and MR4 respectively. The diodes MR5 and MR6 are now shown with dotted connections to provide connection of the capacitors C2 and C3 across the respective inductances L1 and L2.

The operation of the circuit arrangement of FIG. 2 is generally similar to that of FIG. 1 except that by virtue of the feedback diodes MR1 to MR4 being connected to the capacitors C2 and C3 the semiconductor controllable rectifier devices of the inverter bridge configuration may be triggered at any instant without short circuiting the inductances L1 or L2. The limitation of the voltage on the capacitor C1 is now achieved solely by triggering the auxiliary semiconductor controllable rectifier devices TR6 and TR7 at the instant T4. The voltage curves for points $A^1$ and $B^1$ of FIG. 2 are modified somewhat as compared with FIG. 1, as shown in FIG. 3. This circuit configuration has an advantage as compared with the circuit arrangement of FIG. 1, that nearly the whole of the interval between two successive commutations of successive pairs of devices in the bridge configuration of the inverter is available to reset the chokes L1 and L2, whereas in the first arrangement, the resetting time which represented by the period T1 to T4 in FIG. 3, may subtract to a certain extent from the conducting time available to the semi-conductor devices in the bridge of the inverter and so either limit the operating frequency or necessitate some undesirable increase of voltage across the commutating capacitor C1. It should be appreciated, however, that in the arrangement of FIG. 2, the further capacitors C2 and C3 into which the inductive current of L1 and L2 is at least partially diverted, may require to be somewhat larger than is the case in the circuit arrangement of FIG. 1 as they are required to accept the reactive feedback current of the inverter. Hence, it may be that the circuit arrangement of FIG. 1 may be preferred for relatively low frequency applications and the circuit arrangement of FIG. 2 may be preferred for relatively high frequency applications.

Hitherto, no discussion has been given of the manner in which the instant, T4, at which the semiconductor controllable rectifier devices in the bridge configuration of the inverter of FIG. 1 or FIG. 2 may be triggered or at which the auxiliary devices TR6 and TR7 may be triggered, is to be determined. One method of achieving this is by incorporating into the driving circuits for the controllable rectifier devices suitable means embodying a time delay which is fixed or variable according to the operating conditions, which permit sufficient time to elapse for the inductances L1 and L2 to be adequately reset following triggering of the commutation device TR5.

Another method of determining the instant T4 is by providing means for sensing the voltage across the commutating capacitor C1 or across the current limiting inductance L1 or L2 and generating the triggering pulse for the respective pair of bridge devices or the additional auxiliary transistor TR6 and TR7 when the aforesaid voltage reaches a predetermined level. This has the advantage of determining simply and accurately the energy stored in the commutating capacitor C1 in preparation for the next commutation. This method may not, however, be applicable as will be appreciated hereafter, to a case in which the capacitors C2 and C3 are excessively large as compared with the capacitance of the commutating capacitor C1.

Figure 4:
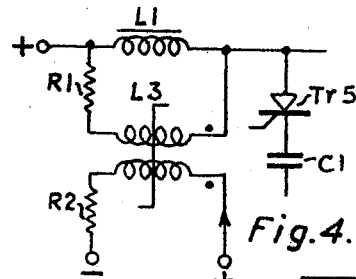
FIG. 4 and FIG. 5 illustrate modifications of a circuit in accordance with the invention.

A third method for determining the triggering instant T4 is by sensing the voltage time integral across one of the series current limiting inductances L1 or L2 as shown in the circuit arrangement outlined in FIG. 4. In FIG. 4 a saturable reactor L3 is connected via a resistor $R_1$ across the inductance L1 and the D.C. winding of the saturable reactor is supplied by a small direct current on a high impedance D.C. source to keep the saturable reactor L3 saturated between commutations such that it presents a high inductance to the voltage impressed across it through additional resistance R1 when the commutating device TR5 is triggered. The saturable reactor L3 is so designed that at the instant T3, as illustrated in the waveforms of FIG. 3, the reactor T3 is reset to its greatest extent and after the instant T3 it moves towards saturation in the original direction. At the instant T4 when the total voltage time integral across the saturable reactor L3 and therefore across the inductance L1 is zero, the saturable reactor L3 saturates and a voltage step is presented across the resistor R1 which is used as an input to the driving circuit for the semiconductor controllable rectifier devices to initiate firing pulses for the apppropriate devices.

Figure 5:
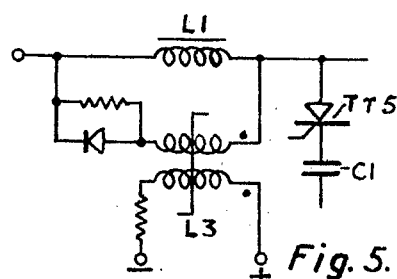

For the circuit arrangements as described herein and in FIG. 2 particularly, the unidirectionally conductive paths provided corresponding to devices TR6 and TR7 may, if desired, be replaced by diodes as shown in FIG. 5 and saturable reactors then operating to provide the connection across the inductances L1 and L2 respectively. It will be appreciated that in this case, the saturable reactors must be rated to carry the circulated current.

Whilst in the foregoing description of various circuit arrangements, the diversion of charge which would otherwise go to the capacitor C1 as being enabled to be accumulated in the further capacitors C2 and C3 or a single capacitor, no mention has so far been made of the manner in which the energy on the further capacitor or capacitors is utilised. The circuits of FIGS. 1 and 2 only operate if some means is provided for the disposal of the energy stored in the commutation circuit, for no D.C. path is provided associated with capacitors C2 and C3. Two methods of recovery of energy stored in the commutation circuit will now be described with reference to the circuits shown in part in FIG. 6 and FIG. 7.

Figure 6:
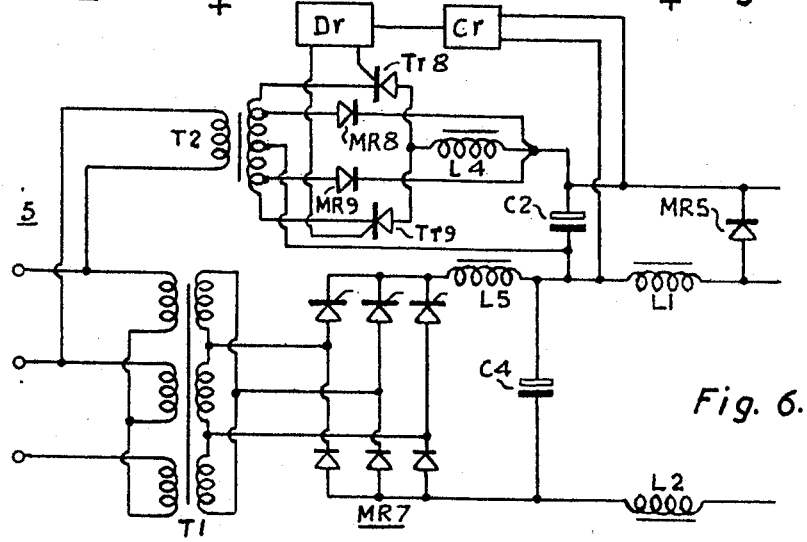
FIG. 6 and FIG. 7 illustrate means whereby the charge on the additional capacitor is dissipated into the circuit.

Referring to FIG. 6, which shows the relevant part of the inverter incorporating the inductances L1 and L2 as previously described and the further capacitor C2 associated with the inductance L1. The inverter is supplied from a three-phase alternating supply source connected to the terminals 5 and applied via a three-phase transformer T1 as shown. This is followed by a three-phase bridge represented by the general reference MR7 which supplies the inverter via a smoothing inductance L5 and an input capacitor C4 as before. The three-phase bridge represented by the general reference MR7 may be a semiconductor controlled rectifier bridge which can, therefore, regulate the input voltage to the inverter if desired. The capacitor C2 in the circuit of FIG. 6 is assumed to be a capacitor so large that the voltage across it may be substantially constant regardless of pulses of current fed back to it from a commutating circuit or the reactive feedback diodes of the inverter as described above with reference to FIG. 1 or FIG. 2. Associated with the capacitor C2, there is a synchronous converter circuit arrangement incorporating the semiconductor controllable rectifier devices TR8 and TR9 and having a smoothing choke L4. Tappings on the primary winding of the output transformer T2 of the synchronous converter are connected via diodes MR8 and MR9 to a point which constitutes the junction of the capacitor C2 and the inductance L4. The other side of the capacitor C2 is connected to a centre tapping on the said primary winding. The secondary winding of the output transformer T2 of the converter is connected across two of the phases of the A.C. supply to the circuit. A driver circuit for the application of triggering signals to the controllable rectifier devices TR8 and TR9 is represented by the block D$r$ and this is controlled by a voltage sensing circuit C$r$ which senses the voltages across the further capacitor C2.

In operation of the circuit arrangement, the voltage sensing device C$r$ senses the voltage across C2 and in response thereto controls the firing angle of the devices TR8 and TR9 which are triggered alternately to transfer energy from the capacitor C2 to the A.C. supply. The sense of the control is such as to maintain normally the voltage across the capacitor C2 constant. Alternatively, however, it will be appreciated that by adjustment of the control the desired voltage on the capacitor C2 may be varied in accordance with operating conditions. The pair of diodes MR8 and MR9 referred to above constitute charge initiating means to establish an initial charge on the capacitor C2 on switching on the supply.

If a certain degree of variation of the voltage on the capacitor C2 in the circuit arrangement of FIG. 6 may be tolerated, the voltage sensing circuit C$r$ may be dispensed with and the converter may be operated at a fixed firing angle in relation to the triggering of the commutation device in the inverter.

Figure 7:
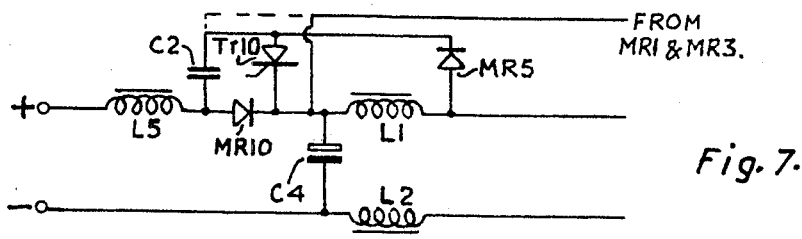

A second and preferred manner of returning accumulated charge on the further capacitor or capacitors, disclosed in the previous circuit arrangements to the input of the respective circuit is shown in FIG. 7 which operates on the direct current input to the circuit and although it introduces a minimal voltage drop into the main current path of the converter, it is considered to be simpler and more efficient than the circuit arrangement of FIG. 6. The additional capacitor C2 in the circuit arrangement of FIG. 7, may be somewhat smaller than the capacitor C2 which is necessary in the circuit arrangement of FIG. 6. A typical value for the capacitor C2 may be five times the capacitance of C1.

The circuit is constructed by connecting between the junction of capacitor C4 of FIG. 1 and the inductance L5, a rectifier MR10 as shown. A further semi-conductor controllable rectifier device TR10 is connected across the combination of C2 and MR10 as shown. The dotted connection shows the alternative connection for the line from the feedback diodes MR1 and MR3 in accordance with the arrangement of FIG. 2.

In operation of the circuit modified in accordance with FIG. 7, the capacitor C2 is discharged substantially completely after each commutation and hence commences with substantially zero charge at time T3 (FIG. 3). During the interval T3 to T4 the controllable rectifier device TR10 is in its forward blocking condition and MR5 and MR10 are both conducting. At the instant T4, the device TR10 is triggered by any of the above three proposed methods and MR10 becomes reverse biased such that C2 discharges in series with the supply and although immaterial it will be appreciated that this enhances slightly the voltage at the output of the inverter. Where the feedback current is returned directly to the reservoir capacitor C4 as shown in FIG. 7, an appropriate delay may be allowed before the main controllable rectifier devices of the inverter are triggered. Alternatively, when the feedback current is taken to the top of the capacitor C2 as indicated by the above mentioned dotted connection, the upper limit of frequency of operation of the inverter may be extended as explained above but it is necessary to rate the device TR10 to carry the full reactive current as well as duplicating the energy recovery components on the other side of the inverter and increasing the size of the capacitors. This duplication of the energy recovery components has hitherto been assumed to be unnecessary by virtue of coupling of the inductances L1 and L2 but clearly, if the circuit is such that the inductances L1 and L2 are not coupled, then duplication of the additional capacitor and associated components may be provided in both FIGS. 6 and 7 as in the case of FIGS. 1 and 2. Further, the modified voltage waveform shown at $VA^1$ in FIG. 3 is associated with the use of the synchronous converter of FIG. 6 as distinct from the arrangement of FIG. 7.

Figure 8:
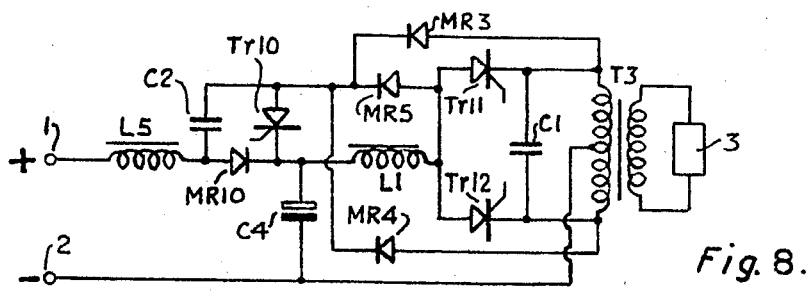
FIG. 8 illustrates the manner of application of the invention to a conventional form of parallel inverter.

Although the present invention has been described in the foregoing in relation to a particular form of commutation circuit in a chopping technique applied to a particular form of bridge type inverter, the invention is in no way limited to such an arrangement. For example, the invention may be applied to a well known form of parallel inverter such as shown in FIG. 8. This inverter supplies a load 3 from D.C. supply terminals 1 and 2 by switching the semi-conductor controllable rectifier devices TR11 and TR12 into the conducting condition alternately to supply current in opposite direction to the centre tapped output transformer T3. Commutation in this case is achieved by the capacitor C1 by the action of rendering one device conducting to render the other non-conducting and vice versa. The circuit again includes a current limiting inductance L1 which connects the supply capacitance C4 to the basic inverter and corresponding components consisting of the diode MR5, an additional capacitor C2 and a controllable rectifier device TR10 and associated diode MR10 are shown in their relationship with the inductance L1 for the purpose of providing a diversion of the current from the inductance L1 on commutation. The circuits associated with the capacitor C2 operate substantially on the lines described above with reference to FIG. 7. Also, the inverter is provided with the feedback diodes MR3 and MR4 which feed back reactive current on the output circuit to the supply to the inverter.

Figure 9:
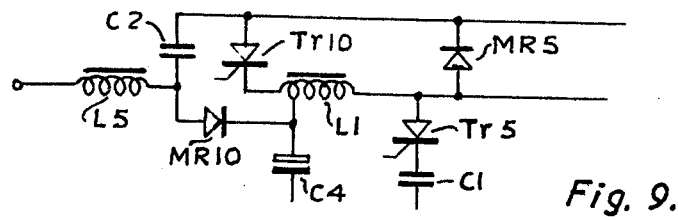
FIG. 9 and FIG. 10 illustrate modifications of parts of the circuits shown in FIGS. 7 and 8.
Figure 10:
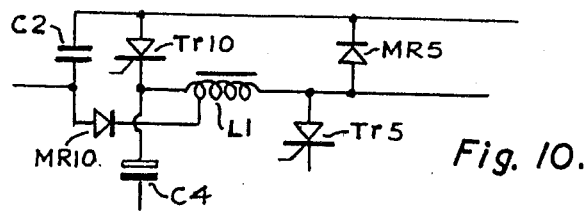

In a circuit arrangement in accordance with the present invention and employing a technique such as illustrated by the dotted connection of FIG. 7 or as employed in the circuit arrangement just described with reference to FIG. 8, in which the inductive feedback current from the load is taken to the capacitor C2 instead of directly to the reservoir capacitor C4, a certain disadvantage may present itself. The circuit may not satisfactorily operate in all conditions of operation for if the flow of inductive feedback current is continuous, the semiconductor controllable rectifier device TR10 once rendered conducting will continue to conduct permanently and complete a circulating current path round the commutating choke L1. This is especially likely in a circuit arrangement according to the invention applied to a three-phase inverter. A modification of the proposal whereby the inductive feedback current is fed back to the capacitor C2, in order to overcome this effect is illustrated in the portion of the circuit which is illustrated in FIGS. 9 or 10. The only difference between the proposals of FIG. 9 and FIG. 10 is in the manner of connection of the capacitor C4. This difference apart, it will be noted that the commutating choke L1 is now tapped near the forward terminal thereof to provide a portion beyond the point at which the diode MR10 is connected thereto so that in the event of the semiconductor controllable rectifier device TR10 being still conducting when commutation is required, the device TR10 receives a reverse pulse across it when the semiconductor controllable rectifier device TR5 is rendered conducting and this extinguishes TR10 in readiness for the next cycle of operation.

Figure 11:
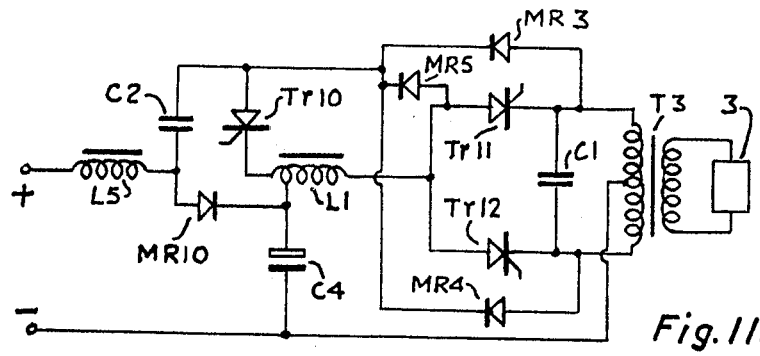
FIG. 11 shows a modification of the circuit of FIG. 8

Reference to FIG. 11 will readily explain the manner in which the proposal of FIG. 9 or FIG. 10 may be applied to the parallel inverter circuit as shown in FIG. 8. Again, the circuitry of FIG. 8 may be expected to operate quite satisfactorily in a single phase inverter as shown in which the reactive feedback current is unlikely to be continuous but the disadvantage referred to is likely to occur if the inverter is adapted to a polyphase form.

Figure 12:
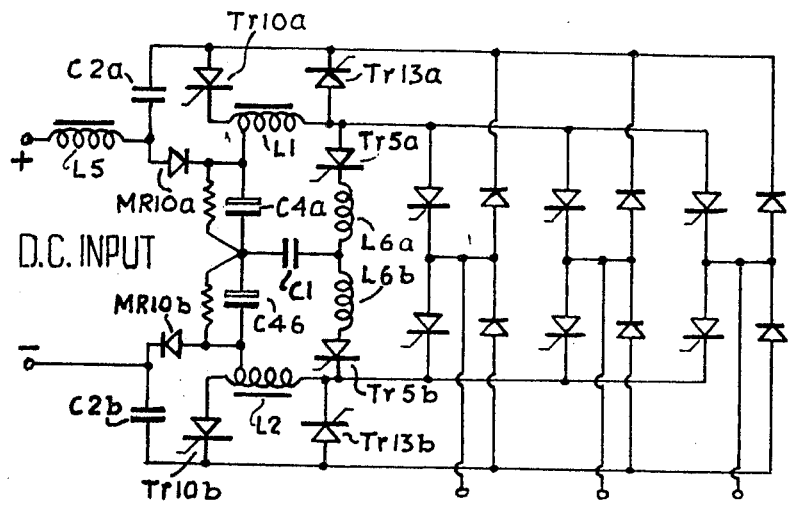
FIG. 12 shows a form of the invention applied to a polyphase inverter circuit.

A form of three-phase inverter arrangement employing the invention is illustrated in FIG. 12 in which it is again apparent that the inductances L1 and L2 are tapped for connection to the diodes MR10a and MR10b in order to overcome the above-mentioned likely disadvantage. A further feature of the circuit arrangement of FIG. 12 is that diodes corresponding to the diode MR5 as shown in FIG. 9 or FIG. 10 are now replaced by respective semiconductor controllable rectifier devices TR13a and TR13b respectively associated with the commutating inductances L1 and L2. The purpose of the substitution of semiconductor controllable rectifier devices for the diodes in this manner, is to enable the potential on the commutating capacitor C1 to rise without restriction when it is required to do so. This requirement can arise when there is no auxiliary charging circuit for the commutating capacitor and it is therefore necessary to build up a relatively higher voltage on the commutating capacitor with a low input voltage to the inverter. The thyristors TR13a and TR13b are, therefore, allowed to remain in a blocking condition until the desired voltage on the commutating capacitor C1 has been attained and the devices TR13a and TR13b are then rendered conducting at suitable instants to limit the commutating charge on C1 to a desired level. Again, this may be achieved by any suitable known circuit responsive to the voltage on the capacitor C1 and requires no further detailed discussion herein.

Having thus described my invention what I claim is:

1. A controllable rectifier circuit including controllable rectifier means for intermittently supplying current from input terminals to output terminals via a current limiting inductance, a commutating capacitor for intermittently diverting current flow from the controllable rectifier means to enable said means to acquire a blocking condition, a further capacitor included in a unidirectionally conductive current path across the inductance for enabling at least partial diversion of circulating inductive current in said inductance away from the commutating capacitor, and an energy return circuit for applying energy acquired by said last-mentioned capacitor in series with the input terminals.

2. A controllable rectifier circuit as claimed in claim 1, wherein said energy return circuit comprises a circuit for intermittently deriving energy from said last-mentioned capacitor.

3. A circuit as claimed in claim 1, wherein said unidirectionally conductive path includes a further controllable device.

4. A circuit as claimed in claim 2, further comprising a unidirectionally conductive path connected from the load to said further capacitor for the flow of inductive load current following said rectifier means acquiring a blocking condition.

5. A circuit as claimed in claim 1, further comprising an additional controllable unidirectionally conductive path connected in parallel with the inductance, said last-named path being capable of being rendered conducting at a desired instant prior to further current being supplied via the inductance to the output terminals to permit continued circulating current in said inductance without further increase of voltage across the commutating capacitor.

6. A circuit as claimed in claim 5, wherein said additional controllable unidirectionally conductive path comprises a controllable rectifier device.

7. A circuit as claimed in claim 5, wherein said additional controllable unidirectionally conductive path comprises a rectifier device connected in series with a suitably biased saturable reactor.

8. A circuit as claimed in claim 1, wherein said energy return circuit comprises a synchronous converter circuit.

9. A circuit as claimed in claim 8, wherein the synchronous converter comprises means including a plurality of controllable rectifier devices and means for rendering said rectifier devices alternately conducting, for connecting the further capacitor to opposite terminals of a center-tapped winding of a transformer, a further winding of said transformer being coupled to the input terminals to the circuit.

10. A circuit as claimed in claim 9, further comprising means for sensing the voltage on the further capacitor and wherein the means for rendering the converter controllable rectifier devices alternately conducting comprises means responsive to said voltage sensing means for maintaining a predetermined voltage on the further capacitor.

11. A circuit as claimed in claim 9, wherein the supply to the circuit is derived from an A.C. source and further comprising charge initiating means for initiating a charge on the further capacitor upon turning on of the A.C. source.

12. A circuit as claimed in claim 11, wherein said charge initiating means comprises rectifier means connecting the transformer to the further capacitor.

13. A circuit as claimed in claim 1, wherein the energy return circuit comprises a controllable switching device via which the further capacitor is connectable across a unidirectionally conductive path between the input terminals and the inductance such that when the controllable switching device is rendered conducting, the last-mentioned path is blocked and the further capacitor is connected in series with the input terminals and the inductance.

14. A circuit as claimed in claim 13, wherein the inductance includes a portion beyond the point at which the said last-mentioned path is connected thereto, said controllable switching device being connected to the said portion.

15. A circuit as claimed in claim 14, wherein the controllable switching device comprises a semiconductor controllable rectifier device.

16. A circuit as claimed in claim 13, further comprising an input ballast capacitor connected to a point between the controllable switching device and the last-mentioned path.

17. A circuit as claimed in claim 16, wherein said point is the input terminal of the inductance.

18. A circuit as claimed in claim 16, wherein said point is the connection of the controllable switching device to the portion beyond the terminal of the inductance.

19. A circuit as claimed in claim 1, wherein said controllable rectifier means comprises a controllable rectifier bridge inverter circuit, the first-mentioned capacitor being connected across D.C. input terminals to the bridge circuit.

20. A circuit as claimed in claim 19, wherein said inductance comprises one of two such inductances connected in respective D.C. supply leads to the inverter bridge circuit.

21. A circuit as claimed in claim 20, wherein the two such inductances are mutually coupled such that the further capacitor provides diversion of inductive current in either such inductances.

22. A circuit as claim in claim 21, wherein a said further capacitor is provided for each of the two such inductances.

23. A circuit as claimed in claim 1, further including sensing means for sensing the occurrence of a predetermined voltage time integral across said inductance and wherein said controllable rectifier means is operable responsive to the sensing of the occurrence of said predetermined voltage time integral across said inductance by said sensing means.

24. A circuit as claimed in claim 23, wherein said sensing means includes a biased saturable reactor connected across the inductance via a resistor for producing a step voltage signal across the resistor at a desired instant in the operating cycle of the circuit at which the saturable reactor experiences a reset to a saturated condition.

25. A controllable rectifier circuit as claimed in claim 1, including means for sensing the attainment of a predetermined voltage across the commutating capacitor and means for operating the controllable rectifier means in the circuit responsive to the attainment of said predetermined voltage.

References Cited

UNITED STATES PATENTS

| | | | |
|---|---|---|---|
| 3,321,697 | 5/1967 | Etter | 321—45 |
| 3,340,453 | 9/1967 | Bradley et al. | 321—45 XR |
| 3,340,456 | 9/1967 | Lehry | 321—44 XR |
| 3,355,654 | 11/1967 | Riseberg | 321—45 XR |
| 3,366,866 | 1/1968 | King | 321—45 XR |

LEE T. HIX, Primary Examiner

W. M. SHOOP, JR., Assistant Examiner